US012759922B2

(12) United States Patent
Fokine et al.

(10) Patent No.: US 12,759,922 B2
(45) Date of Patent: Oct. 13, 2026

(54) METHOD AND APPARATUS FOR ADDITIVE MANUFACTURING OF GLASS

(71) Applicants: Michael Fokine, Saltsjö-Boo (SE); Taras Oriekhov, Täby (SE); Chunxin Liu, Stockholm (SE)

(72) Inventors: Michael Fokine, Saltsjö-Boo (SE); Taras Oriekhov, Täby (SE); Chunxin Liu, Stockholm (SE)

(73) Assignee: NOBULA3D AB, Stockholm (SE)

( * ) Notice: Subject to any disclaimer, the term of this patent is extended or adjusted under 35 U.S.C. 154(b) by 231 days.

(21) Appl. No.: 18/568,568

(22) PCT Filed: Jul. 11, 2022

(86) PCT No.: PCT/EP2022/069232

§ 371 (c)(1),
(2) Date: Dec. 8, 2023

(87) PCT Pub. No.: WO2023/285338

PCT Pub. Date: Jan. 19, 2023

(65) Prior Publication Data

US 2024/0368018 A1 Nov. 7, 2024

(30) Foreign Application Priority Data

Jul. 14, 2021 (SE) .................................. 2150939-3

(51) Int. Cl.
*C03B 19/00* (2006.01)
*B33Y 10/00* (2015.01)
(Continued)

(52) U.S. Cl.
CPC .......... *C03B 19/00* (2013.01); *C03B 37/0256* (2013.01); *C03B 37/15* (2013.01); *B33Y 10/00* (2014.12); *B33Y 70/00* (2014.12)

(58) Field of Classification Search
CPC ........ C03B 19/00; B33Y 10/00; C03C 25/106
See application file for complete search history.

(56) References Cited

U.S. PATENT DOCUMENTS 4,302,233 A 11/1981 Ahne et al.
5,714,196 A * 2/1998 Vacha .................. C03C 25/106 427/163.2

(Continued)

FOREIGN PATENT DOCUMENTS

CN 106566269 A 4/2017
CN 111635124 A 9/2020

(Continued)

OTHER PUBLICATIONS

CN 111635124 A (Jiang) Sep. 8, 2020 (English language machine translation). [online] [retrieved Oct. 16, 2025]. Retrieved from: Espacenet. (Year: 2020).*

(Continued)

*Primary Examiner* — Erin Snelting
(74) *Attorney, Agent, or Firm* — NIXON & VANDERHYE

(57) ABSTRACT

This relates to an additive manufacturing method for producing a three-dimensional component made of glass, the method including the steps of: feeding continuously a glass filament having a flame retardant or self-extinguishing protective film applied to the surface thereof, from a filament feeding nozzle to a heating source for removing the flame retardant or self-extinguishing protective film and softening the glass fiber, applying the softened glass filament to a surface of a substrate or object, wherein the flame retardant or self-extinguishing protective film is made of polyimide-based material having a thickness in the range of 1 μm to 50

(Continued)

μm, wherein the fed glass filament length is less than 5 millimeters. The invention is also related to a glass filament and the use of the same.

8 Claims, 3 Drawing Sheets

(51) Int. Cl.

| | |
|---|---|
| ***B33Y 70/00*** | (2020.01) |
| ***C03B 37/025*** | (2006.01) |
| ***C03B 37/15*** | (2006.01) |

(56) References Cited

U.S. PATENT DOCUMENTS

| | | | | |
|---|---|---|---|---|
| 10,266,442 | B2 | 4/2019 | Klein et al. | |
| 10,464,305 | B2 | 11/2019 | Inamura et al. | |
| 2019/0292377 | A1 | 9/2019 | Rapp et al. | |
| 2019/0352210 | A1 | 11/2019 | Drewnowski et al. | |
| 2020/0016840 | A1 | 1/2020 | Bracha et al. | |
| 2020/0039868 | A1 | 2/2020 | Rapp et al. | |
| 2022/0267188 | A1* | 8/2022 | Höner | B33Y 80/00 |

FOREIGN PATENT DOCUMENTS

| | | | |
|---|---|---|---|
| EP | 3757081 | A1 | 12/2020 |
| JP | H02187713 | A | 7/1990 |
| JP | H05303021 | A | 11/1993 |
| JP | 2003329901 | A | 11/2003 |
| JP | 2005173084 | A | 6/2005 |
| WO | 2017214179 | A1 | 12/2017 |
| WO | 2018002001 | A1 | 1/2018 |
| WO | 2018163006 | A1 | 9/2018 |
| WO | 2020118157 | A1 | 6/2020 |
| WO | 2020259898 | A1 | 12/2020 |

OTHER PUBLICATIONS

Grabe et al., Additive manufacturing of fused silica using coaxial laser glass deposition: experiment, simulation, and discussion, Algorithms and Technologies for Multispectral, Hyperspectral, and Ultraspectral Imagery XIX—Proceedings of SPIE, Mar. 8, 2021, pp. 116770Z-1-116770Z-12, vol. 11677.

Hostetler et al., Fiberfed Printing of Free-Form Free-Standing Glass Structures, Solid Freeform Fabrication 2018: Proceedings of the 29th Annual International, 2018, pp. 994-1002.

T. Grabe, et al., "Additive manufacturing of fused silica using coaxial laser glass deposition: experiment, simulation, and discussion", Algorithms and Technologies for Multispectral, Hyperspectral, and Ultraspectral Imagery XIX—Proceedings of SPIE, vol. 11677, Mar. 8, 2021, pp. 116770Z-116770Z (Submission Pending).

J.M. Hostetler, et al., "Fiberfed Printing of Free-Form Free-Standing Glass Structures", Solid Freeform Fabrication 2018: Proceedings of the 29th Annual International, 2018, pp. 994-1002 (Submission Pending).

International Preliminary Report on Patentability for PCT/EP2022/069232 completed Oct. 9, 2023, 13 pages.

Written Opinion of the International Preliminary Examining Authority for PCT/EP2022/069232 mailed Jun. 13, 2023, 6 pages.

International Search Report for PCT/EP2022/069232 mailed Oct. 10, 2022, 5 pages.

Written Opinion of the ISA for PCT/EP2022/069232 mailed Oct. 10, 2022, 6 pages.

Biswas, Dipak R. "Characterization of polyimide-coated optical fibers." Optical Engineering, vol. 30, No. 6, Jun. 1991, pp. 772-775.

Office Action, issued in European Patent Application No. 22741282.2 dated Jun. 18, 2025.

Office Action, issued in Japanese Patent Application No. 2024-502124 dated Mar. 16, 2026.

* cited by examiner

METHOD AND APPARATUS FOR ADDITIVE MANUFACTURING OF GLASS

CROSS-REFERENCE TO RELATED APPLICATIONS

This application is the U.S. national phase of International Application No. PCT/EP2022/069232 filed Jul. 11, 2022 which designated the U.S. and claims priority to SE 2150939-3 filed Jul. 14, 2021, the entire contents of each of which are hereby incorporated by reference.

TECHNICAL FIELD OF THE INVENTION

The present invention relates in general to the field of additive manufacturing. In particular, the present invention relates to a method and apparatus for forming three-dimensional components from a feedstock material made of glass.

BACKGROUND OF THE INVENTION

In glass 3D printing, or Additive manufacturing, the feedstock material can be supplied in either (1) molten form (molten glass), (2) liquid form (glass filled liquid resin), (3) solid form using glass rods or (4) glass fibers.

(1) In U.S. Pat. No. 10,464,305B2 and U.S. Pat. No. 10,266,442B2 a large crucible is used to pour out molten glass, onto a build plate, in a predetermined geometry using translation stages. The drawback of this method is the risk of nozzle damaging by molten glass and is therefore limited to multicomponent silicate glasses such as soda-lime glass or borosilicate glass having a lower melting temperature.

(2) In US2019/0292377A1k, US2020/0039868A1, WO2017/214179A1, and WO2020/118157A1 liquid resins filled with glass nanoparticles are used to build a 3D solid body using, e.g., photolithography or ink-jet printing techniques. Any organic binder is subsequently burnt off, after which the porous object is sintered at high temperature into a solid glass object. A drawback of these techniques is the time-consuming post processing required and that the thickness/dimensions of the printed object is limited (to a few mm's). The printing accuracy heavily depends on the shrinkage control and the homogeneity of the mixture. Defects i.e., deformations, pores, and cracks are difficult to avoid.

(3) In WO2018/163006A1 US2020/0016840A1 continuous rod feeding is used for glass 3D printing. The printing use glass rods as raw material. Feeding rods are loaded in a rotating cassette and fed through a printing head that melts the glass and being subsequently deposited on a substrate. The continuous feeding is realized by thermally bonding the rods during the process. Using a crucible to melt the glass this technique is limited to multicomponent silicate glasses such as soda-lime glass or borosilicate glass having a lower melting temperature. This technique also risks from nozzle damaging owing to the corrosive nature of molten glass.

(4) Laser based melting of thin glass filaments or optical fibers [J. M. Hostetler et al., FIBER-FED PRINTING OF FREE-FORM FREE-STANDING GLASS STRUCTURES, Solid Freeform Fabrication 2018: Proceedings of the 29th Annual International, 994-1002], [T. Grabe, et al., Additive Manufacturing of fused silica using coaxial laser glass deposition, experiment, simulation and discussion, Proc. SPIE 11677, Laser 3D Manufacturing VIII, 116770Z (8 Mar. 2021)] have also been used for glass 3D printing. Using a laser, non-contact heating is achieved so the melt is not in constant contact with the walls of a crucible, thereby avoiding crucible corrosion and contamination of the glass melt. Here the silica glass fiber/filament is continuously fed into a hot-zone at temperatures sufficient to soften the glass. For silica glass (quartz- or fused-silica) temperatures as high as 1800 to 2000 C is required. One method is to feed bare glass filament, especially for filament size with diameters typically larger than 1 mm.

However, it is well known in the field of optical fiber manufacturing that bare thin glass fibers become fragile and break if not properly protected with a thin protective coating or protective film. The protective coating or protective film is used to protect the fiber surface from mechanical (e.g., scratches) or chemical (e.g., reactions with water or other chemicals) interactions that quickly reduce the mechanical strength of the fiber. For telecommunication fibers the coating/film also has the function to reduce mechanically induced losses due to micro-bending.

For the same reasons, when using thin glass fibers for additive manufacturing a protective coating is required in order to protect the glass filament during storage and handling. The protective coating can be applied during filament fabrication.

In prior filament-based glass additive manufacturing the protective coating needs to be removed from the glass filament prior printing [J. M. Hostetler et al., FIBER-FED PRINTING OF FREE-FORM FREE-STANDING GLASS STRUCTURES, Solid Freeform Fabrication 2018: Proceedings of the 29th Annual International, 994-1002]. Stripping off the coating can be performed using mechanical or chemical means (e.g., using sulfuric acid, dichloromethane) prior feeding the filament into the hot additive fabrication zone.

As mechanical stripping of the coating may further weaken the mechanical strength of the filament, this is not an ideal solution as filament breakage during printing will cause major interruptions of the printing process. Using chemical means is not preferred due to risks involved when using strong acids (sulfuric acid) or dichloromethane (carcinogenic). This approach, however, causes the fiber to be left unprotected during the last stage: the mechanical feeding of the fiber into the hot-zone. The striping process also limits the total length of the printable glass filament (i.e., maximum mechanical stripping of less than a few meters, maximum chemical stripping less than several 10's of meters), which severely damages the continuity and capability (volume) of the 3D printing process.

As the filament can become brittle without coating and stripping the coating may further weaken the mechanical strength of the filament, this brings extra risks as filament breakage during printing will cause major interruptions of the printing process.

An alternative method is to burn off the coating as demonstrated by [T. Grabe, et al., Additive Manufacturing of fused silica using coaxial laser glass deposition, experiment, simulation and discussion, Proc. SPIE 11677, Laser 3D Manufacturing VIII, 116770Z (8 Mar. 2021)]. As the hot-zone is heated to very high temperatures the coating will start to burn near the hot-zone, i.e., the hot-zone itself can be used to remove the coating. A problem with said method with commonly used fiber coatings is that it may cause unwanted combustion bi-products, be more likely to leave residues affecting the purity of the print, and it is not energy efficient. Another issue with this method is that there is a problem of controlling the amount of burned off coating; it may happen that the coating can ignite and start to burn off long lengths of filament even after the heat source is turned off.

Experimental flame spreading tests have been performed on standard telecommunication glass fiber. The glass fiber had a diameter of 125 μm with a standard acrylic-based coating 62.5 μm thick, resulting in a total diameter of 250 μm. The coating was ignited using a $CO_2$-laser and when the laser was turned off flame spreading occurred at a flame traveling velocity of approximately 10 mm/s (600 mm/min), which is typically faster than the filament feeding rate during glass 3D printing.

When depositing the first layer onto the printing substrate, filament feeding is typically slow to ensure sufficient attachment to the build plate. Under typical conditions 3D printing glass is not performed by depositing a single, long length of continuous glass filament at constant feeding rate, but rather the filament is deposited in segments layer-by-layer depending on the geometry of the object to be printed. Between segments the filament is cut off, during which the filament feeding rate is zero or even negative (filament retraction). The relative position of the feeding nozzle is then moved to a new location to continue with a different section of the print. During printing there is therefore a number of different printing conditions, combinations of laser irradiation conditions (temperature of hot-zone) and filament feeding rates as well as feeding direction.

If the protective coating shows self-sustained burning (combustion) there is a risk of flame spreading that can damage the feeding nozzle, destroy large lengths of filament and potentially destroy the 3D printer and cause personal injury. Using a protective coating that shows self-sustained combustion is therefore very hazardous.

The coating solutions for 3D printing glass filament described in [WO2020259898], include polysaccharides and polyethenes, are generally not flame retardant or self-extinguishing and are not suitable for applying to glass filaments in commonly used optical fiber draw towers, but preferably applied through dip-coating or by roller. These coatings typically have a decomposition temperature below 400 C, thereby requiring a longer length of extruding filament, typically longer than 5 to 20 mm.

To reduce flame spreading one could use inert gasses, such as nitrogen or argon, to extinguish the flame, however a problem is that this would significantly affect the combustion (burn-off) efficiency of the coating and leave coating residues that would be embedded into the printed object. Another option is to use forced convection of air or oxygen gas to reduce the flame spreading velocity, while maintaining efficient decomposition of the coating. A problem with this method is that it may not extinguish the flame but simply reduce the flame traveling velocity. In addition, the injected gas stream will cause significant and uncontrolled variations in the temperature and a reduced temperature stability of the hot-zone will result in poor print quality or failed prints.

OBJECT OF THE INVENTION

The present invention aims at obviating the aforementioned problem. A primary object of the present invention is to provide an improved glass filament for use when forming three-dimensional components.

Another object of the invention is to provide an additive manufacturing method producing a three-dimensional component made of glass.

SUMMARY OF THE INVENTION

According to the invention at least the primary object is attained by means of an additive manufacturing method having the features defined in the independent claims.

Preferred embodiments of the present invention are further defined in the dependent claims.

According to a first aspect of the present invention it is provided an additive manufacturing method for producing a three-dimensional component/object made of glass, said method comprising the steps of:

a. feeding continuously a glass filament from a filament feeding nozzle, in particular the glass filament is made of fused quartz or fused silica, wherein the glass filament has a flame retardant or self-extinguishing protective film applied to the surface thereof, to a heating source for removing said flame retardant or self-extinguishing protective film and softening said glass filament,
b. applying said softened glass filament to a surface of a substrate or print/object, wherein said flame retardant or self-extinguishing protective film, is made of polyimide-based material and has a thickness in the range of 1 μm to 50 μm,
c. wherein the fed glass filament length (L) is less than 5 millimeters.

The advantage of this embodiment when manufacturing the three-dimensional component is that once the heat source is removed or laser irradiation turned off, the combustion of the coating is terminated as the coating is flame retardant and self-extinguishing. Another advantage is that the combustion of the coating does not produce toxic elements. Another advantage is that the coating can easily be applied to long lengths of filament during filament fabrication using conventional optical fiber fabrication techniques.

In various example embodiments according to the present invention said glass filament is a coated glass fiber having a diameter in the range of 100-500 μm.

The advantage of these embodiments is that different diameter of the filament may be chosen depending on the complexity and/or design of three-dimensional component.

In various example embodiments of the present invention said heating source is at least one laser source.

The advantage of these embodiments is that one or a plurality of various types of laser sources may be used for heating purpose.

In another aspect of the present invention, it is provided a glass filament for additive manufacturing of a three-dimensional component of glass, the glass filament provided with a flame retardant or self-extinguishing protective film applied to the surface thereof, wherein the film is made of polyimide-based material and has a thickness in the range of 1 μm to 50 μm.

The advantage of this embodiment is that it provides for an additive manufacturing feedstock material which is flame retardant, self-extinguishing and does not create any toxic elements when used in additive manufacturing.

In various example embodiments of the present invention said glass filament is hollow.

The advantage of these embodiments is that a capillary structured filament may be used for additively printing complex structures such as for instance additively manufactured components with integrated microfluidic structures, i.e. hollow features/structure. The volume of said hollow portion may be between 10-70% of a volume of said glass content in said glass fiber.

In another aspect of the present invention it is provided a use of a glass filament in an additive manufacturing method for producing three-dimensional components made of glass, wherein said glass filament is provided with a flame retardant or self-extinguishing protective film applied to the surface thereof, wherein the film is made of polyimide-based material and has a thickness in the range of 1 μm to 50 μm.

Further advantages and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
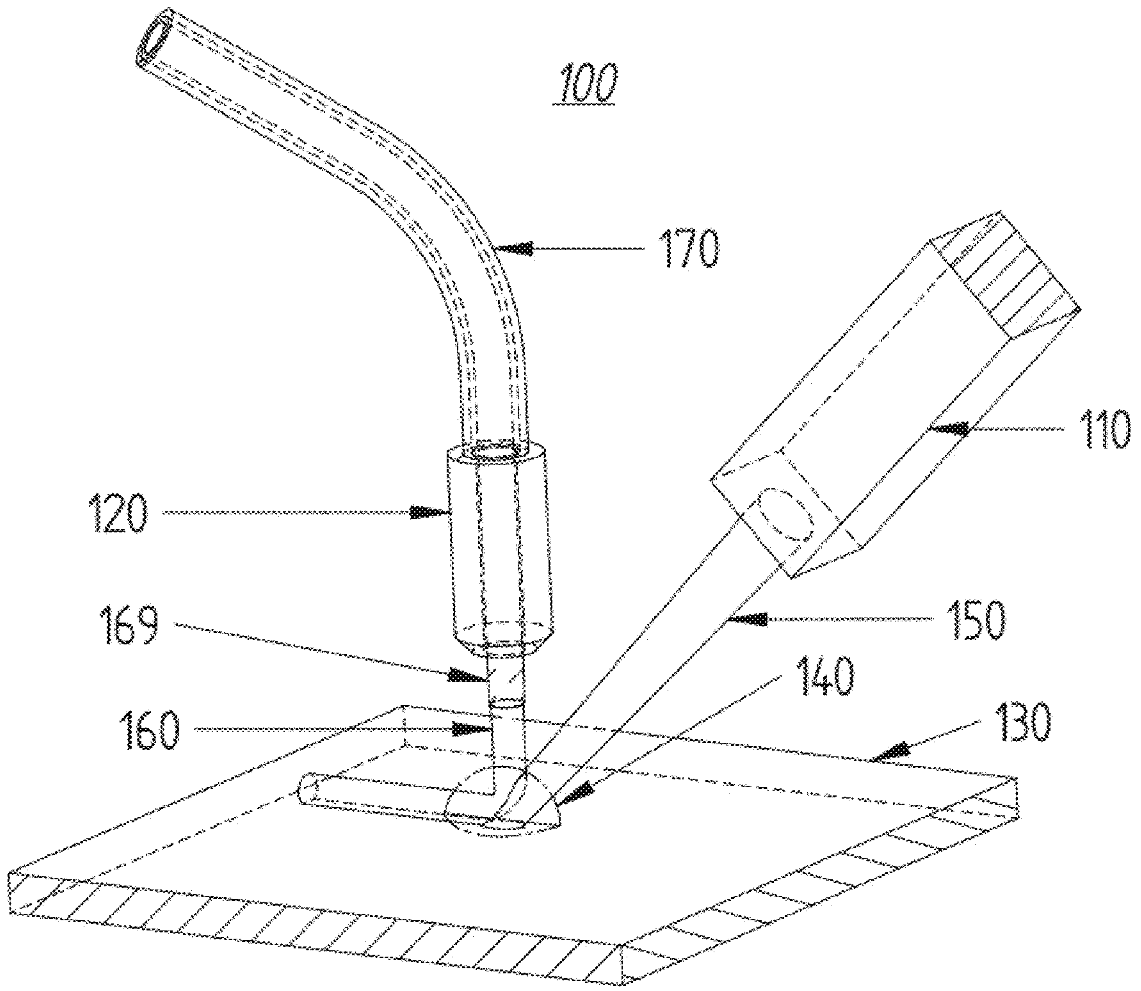
FIG. 1 depicts a schematic side view of an example embodiment of an apparatus for manufacturing a three-dimensional component made of glass which may be used for performing the method according to the present invention.

The process invention here refers to a new Additive Manufacturing (AM) process where using a digital model, a component geometry is built by fusing together glass filaments layer-by-layer, freestanding or localized deposition using an energy source such as a laser beam through localized melting.

This invention is about a direct manufacturing process by integrating a flame retardant and/or self-extinguishing protective film/coating and its removal from the glass filament within the printing process. This means, that the new process will be able to manufacture fully or near-fully dense glass component/object using glass filaments and will overcome all the shortcomings of the prior art glass manufacturing methods.

The new process will enable direct manufacturing of three-dimensional glass components without toxic bi-products, which may avoid a health risk.

Here we have identified polyimide-based coatings as a suitable filament coating for laser-based 3D printing. Polyimides are inherently resistant to flame combustion. Polyimides exhibit flame retardant and self-extinguishing properties. Experiments have shown that when initiating combustion, using open flame or $CO_2$-laser heating, polyimide coated fused silica and fused quartz fibers with a diameter of approximately 200 μm do not ignite or show sustained combustion once the heat source has been removed or turned off.

A further benefit of polyimide-based coatings is that they can be applied to the glass filament with techniques commonly used in standard optical fiber draw towers. Typical coating thickness of polyimide coatings range from 1 μm to 50 μm, typically 5 μm to 25 μm.

Additional benefits is that in general the combustion by-products of polyimide burned in air (or oxygen) atmosphere is carbon-dioxide, water and nitrogen-oxide, i.e., combustion produces non-toxic fumes.

It is therefore crucial that the glass filament film/coating is resistant to flame combustion, should be flame retardant and/or show self-extinguishing properties in order to protect the feeding nozzle, filament and filament cassette, 3D printer as well as physical safety of operator and surroundings.

Polyimide decomposition occurs at temperatures above 400 C, typically above 600 C. This high temperature is advantageous as the coating is then removed very close to the hot-zone, enabling a shorter distance between the tip of feeding nozzle and the hot-zone thereby allowing for a shorter length of filament extruding from the nozzle. The fed glass filament length L shall be less than 5 millimeters. By using a shorter length of filament extruding from the nozzle, the mechanical properties of the filament (stiffness) enables significantly improved printing accuracy and resolution during printing. Suitable length of extruding filament with a diameter of around 200 μm is typically less than 5 mm with the polyimide coating being removed typically within 1 mm of the hot-zone.

FIG. 1 depicts a schematic side view of an example embodiment of an additive manufacturing apparatus 100 according to the present invention which is configured to manufacture three-dimensional components in glass. Said apparatus 100 comprises a stage/substrate 130, a laser source 110 and a filament feeding nozzle 120. The filament feeding nozzle 120 may be configured to move in an x-y plane relative to said stage 130 so that said filament feeding nozzle 120 is covering a predetermined area of said stage 130. The relative movement may be that said stage 130 is fixed and said filament feeding nozzle 120 is moving in x-y-z direction. Alternatively, the stage 130 may be movable in x-y whereas said filament feeding nozzle is fixed. One or both of said filament feeding nozzle 120 and/or said stage 130 may be movable in Z direction in order to allow for additively manufacture the three-dimensional component and keeping a distance between the filament feeding nozzle and a top surface of the component to which a new layer is to be attached at a constant distance, i.e., for every new applied layer the stage 130 may be moved downwards in Z-direction with a distance corresponding to the thickness of new applied layer or the filament feeding nozzle 120 may be moved upwards in Z-direction with a distance corresponding to the thickness of new applied layer or a combination of movement of said stage downwards in Z-direction and said filament feeding nozzle upwards in Z-direction in order to keep a distance between the filament feeding nozzle and a top surface of the component to which a new layer is to be attached at a constant distance. Filament 160 may be fed to the filament feeding nozzle 120 via a guide tube 170. The laser source 110 may be a $CO_2$-laser, CO-laser, Nd:YAG laser, fiber laser, excimer laser, nitrogen laser or the like. The laser beam 150 may be continuous or pulsed. The laser beam softens or melts the filament in a hot-zone 140 in vicinity to the stage onto which said softened or molten glass is to be attached.

The filament feeding nozzle 120 and/or the stage 130 may be arranged on at least one motorized support. A control unit may control the relative movement of said filament feeding nozzle with respect to said stage 130. Said control unit may also control laser and laser optics.

In FIG. 1 the filament feeding nozzle 120 is providing feedstock material 160 onto a stage 130 for forming a layer of the three-dimensional component. A build plate may be provided on the stage 130 onto which the three-dimensional component is to be formed. The build plate may be made of any material, e.g., the same material as the final three-dimensional component, ceramic material or any other metallic material which is different to the material in the three-dimensional component. The thickness of the build plate may be in the range of a few tenth of a mm to several cm's.

The first step is the fusion and deposition of feedstock material onto the stage 130. The filament feeding nozzle locally deposits the feedstock material along a predefined path. The filament feeding nozzle may heat the feedstock material before it leaves the nozzle on its way towards the stage 130. The nozzle may be adapted to the size and shape of the feedstock material.

A three-axes kinematic may position the filament feeding nozzle 120 in the machine's work envelope and generates the three-dimensional component layer by layer. The feedstock material 160 is a glass filament. The glass filament 160 is provided with a flame retardant and/or self-extinguishing protective coating or protective film 169 applied to the surface thereof.

In FIG. 1 only one filament feeding nozzle 120 is shown to be used. In various example embodiments multiple filament feeding nozzles maybe used in series or in parallel. In various example embodiments multiple strings of feedstock material 160 may be provided on the stage 130 simultaneously in order to speed up the deposition of feedstock material onto the stage 130.

One feedstock feeding nozzle may provide feedstock material or filament 160 at a first predetermined layer area of the three-dimensional component and two or more nozzles may be used for a second predetermined layer area of the three-dimensional component, i.e., the layer formation may alter between one, two, three or more nozzles depending on the shape of the layer to be formed and/or type of material to be added. In various example embodiments a plurality of nozzles for providing feedstock/filament onto the substrate may have the same diameter or different diameter. A plurality of filament feeding nozzle may provide feedstock material of different glass materials. In various example embodiment one feedstock feeding nozzle may comprise a plurality of different feedstock material, e.g., a plurality of fibers of the same material, different materials and/or different diameters.

In synchronization to filament extrusion, a tip of the filament 180 is positioned according to a predefined path. This path is derived by slicing the geometry of the work piece into layers and calculating a time-efficient trajectory for the extrusion of the filament 160. The positioning may be done by a three-axes positioning unit. It is intended to extend the manufacturing flexibility with a five-axes kinematic in order to further realign the work piece with reference to the gravity field of Earth.

In a first option simultaneous processing with a travelling laser beam, sintering/melting the deposited glass filament 160, following in close proximity to the filament deposition.

Alternatively, sintering/melting a thin layer/s of the glass filament with high power laser beam through selective laser scanning of the latest printed layer/s. The process may require a controlled heat input and timing. To ensure geometric accuracy, in-situ measurements may be made which enable the direct compensation of the process variance. Imperfections in the material may require a quality inspection of the sintered/melted glass layers. In-situ quality control ensuring geometric accuracy, appropriate temperature, and gas content and pressure in the printing environment.

To verify and validate the process capability, the following aspects may require further testing such as evaluation of the achievable manufactured layer, fulfilment of minimum geometric accuracy requirements, quantification of material shrinkage from the nominal design, quantification of the achievable layer adhesion and/or ensuring defect-free 3D printing.

One or a plurality of laser beams may be used simultaneously for melting/softening the glass filament.

The inventive idea concerns glass filaments, for use in laser-based glass 3D printers. Bare glass filaments possess poor mechanical properties, and thus are susceptible to breakage. In order for mechanical and chemical protection of the glass filament during storage and handling, a protective coating is required. For increased safety during machine operation the coatings needs to be of flame retardant and self-extinguishing type to avoid self-sustained open flame spreading. The flame retardant and self-extinguishing protective coating can be applied during filament fabrication, using, e.g., a fiber draw tower used to produce optical fibers. A furnace heats the preform (large version of filament in both shape and composition). The softened glass is then pulled using a capstan in combination with a diameter gauge and a tension meter for the correct filament dimensions. As the filament is being pulled, the preform is fed further into the furnace. Typically, a coating resin may be introduced into a coating cup, which the filament is passing through. The coating may then be subsequently cured, either thermally or using e.g., UV lamps, prior to winding the filament onto storage and transport spools. Polyimides are inherently resistant to flame combustion. Polyimides exhibit flame retardant and self-extinguishing properties. Curing temperatures for polyimide-based coatings on optical fibers may typically be performed in the temperature range of about 100 to 400 C.

Polyimide based coatings on optical fibers can survive operating temperatures of around 300 C and are commonly used for higher-temperature (sensing) applications. Here coating thickness of 10 to 15 μm is typically used. Thicker coatings can be applied by repeating the coating procedure, adding multiple coating layers.

For glass filaments the coating thickness should be as thin as possible, while ensuring sufficient mechanical and chemical protection of the fiber. The filaments we have evaluated that gave good results have a single layer polyimide coating thickness of approximately 5 μm.

Suitable outer diameters of glass filaments are in the range 100 μm to 500 μm. The diameter has a large impact on the mechanical properties of the filament with increased diameter resulting in more stiff filaments. The translation of the nozzle and filament relative to the printed structure, during printing, results in a lateral force on the filament. A deviation of the filament position depends on viscosity and surface tension of the liquid glass in the hot-zone 140, as well as printing speed. A schematic of a printing nozzle and extruding filament is shown in the FIG. 2. With a stiffer filament, the distance between the filament feeding nozzle and hot-zone 140 can be increased. The filament diameter, nozzle design, and distance to the hot-zone 140 therefore has a large effect on the print resolution, accuracy and quality. A large filament diameter and short extruding filament length will reduce the filament deviation during printing. Increasing the filament diameter reduces the resolution of the printer. If the extruding filament length is too short the filament feeding nozzle can be damaged by the hot-zone that may reach temperatures in excess of 2000 C.

The total deflection/deviation δ of the filament is given by:

$$\delta = \frac{4FL^3}{4E\pi r^4},$$

where F is the retention force applied by the relative movement during printing process, L is the extruding filament length, E is the Young's modulus of the filament material, r is the radius of the filament. Theoretically, under the same processing conditions the filament with a diameter of 200 μm deflects one quarter to that of the filament having a diameter of 125 μm. Using a filament diameter of 200 μm and an extruding filament length smaller than 5 mm, the deflection results in sub-μm and can be considered negligible.

During glass 3D printing, the glass filament is continuously fed to a hot-zone at 1800 to 2200 C. One common method is to feed using uncoated glass optical fibers. However, since most optical fibers are produced with coating, removal of the coating 169 is required to produce pure glass filament prior to printing. Stripping off the coating 169 can be performed using mechanical or chemical means (e.g., using sulfuric acid, dichloromethane). The striping process limits the total length of the printable glass filament i.e., maximum mechanical stripping of a few meters, maximum chemical stripping of a few 10's of meters, which severally damages the continuity and capability (volume) of the 3D printing process. As the filament can become brittle without coating and stripping the coating may further weaken the mechanical strength of the filament, this brings extra risks as filament breakage during printing will cause major interruptions of the printing process. Using chemical means is not preferred due to risks involved when using strong acid (sulfuric acid) or dichloromethane (carcinogenic).

Another approach is to directly feed the coated filament. With protective coating 169, the printable filament length is then extended to kilometers range. However, as filament is commonly coated by flammable polymers e.g., acrylics, this approach can cause an open flame on the filament due to the high printing temperature, leading to the printing failure and likely destruction of filament and damage to the 3D printer. Besides, standard coating has a thickness at about 62.5 μm, considerably too "thick" for glass 3D printing. Direct burning of the "thick" coating is not an ideal solution as it may produce more combustion bi-products, be more likely to leave residues affecting the purity of the print, and it is not energy efficient.

Our approach is to produce the glass filament 160 with thin flame retardant and self-extinguishing coating 169. As the hot-zone 140 is heated to very high temperatures, using e.g., $CO_2$-laser beams, the coating will start to burn near the hot-zone 140, i.e., the hot-zone 140 itself can be used to remove the protective coating 169. While the protective coating 169 is flame retardant and self-extinguishing, the risk of open flame is eliminated. Once the lasers and filament feeding are turned off, the combustion process of the coating will stop. A thin coating will be easily burnt off. Besides increasing efficiency and reducing environmental impact, it will also reduce the production of combustion bi-products. The ideal coating may have a non-toxic chemical composition to further reduce toxic fumes produces during combustion e.g., should not contain halogens.

The inventive filament 160 for additive manufacturing provides for the possibility to apply a thin flame retardant and self-extinguishing protective coating layer 169 to glass filament, while still providing mechanical and chemical protection of the filament during (temporary) storage and handling. The protective coating 169 may be easily removed by thermal means (heating/plasma/laser irradiation). The protective coating 169 may not contain toxic elements or produce toxic combustion products when burned. The protective coating 169 may not have properties of self-sustained combustion.

The additive manufacturing method according to the present invention may be used for producing a three-dimensional component made of glass. Said method comprising the steps of feeding a glass filament having a flame retardant and/or self-extinguishing protective film applied to the surface thereof, from the filament feeding nozzle to a heating source for removing said flame retardant and self-extinguishing protective coating and softening said glass fiber and applying said softened glass fiber to a surface of a substrate or print/object, wherein said flame retardant and self-extinguishing protective coating is made of polyimide-based material and has a thickness in the range of 1 μm to 50 μm, wherein the fed glass filament length L is less than 5 millimeters. The feeding of glass filament may be continuous or discontinuous.

Figure 2:
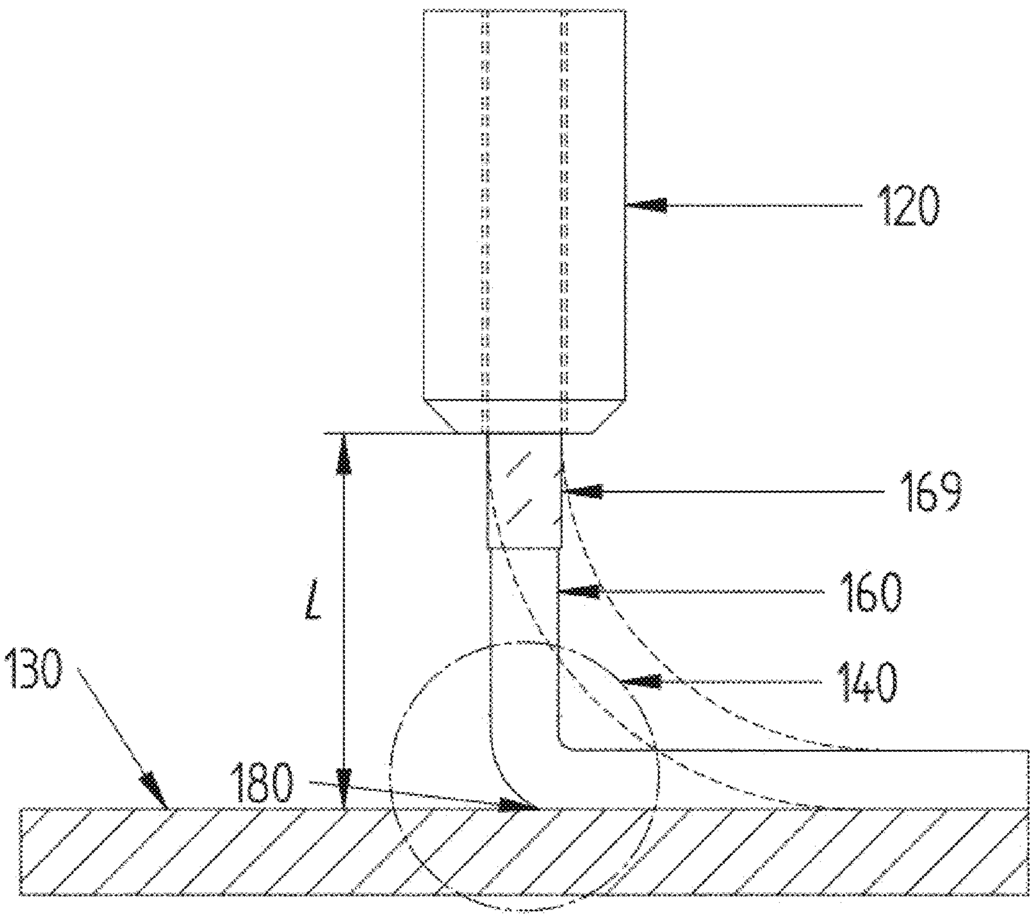
FIG. 2 depicts a schematic side view of a glass filament and a filament feeding nozzle.

FIG. 2 depicts a side view of a filament feeding nozzle 120. Extending from said filament feeding nozzle 120 is a filament 160. The length of said filament from an exit of said filament feeding nozzle 120 to a surface of a substrate 130 where at least one laser beam impinges on said filament is denoted by L. It shall be understood that the fed glass filament length L is the distance between the filament feeding nozzle 120 and the surface onto which the glass filament 160 is applied, either the surface of the substrate 130 or the surface of print/object. In various example embodiments the fed glass filament length L may be larger than 10 mm but according to the present invention less than 5 mm. A larger L than 5 millimeters will increase the filament deviation, denoted by dashed filament in FIG. 2. Any filament deviation which may be a distance between a non-deviated center-portion of a tip 180 of said filament 160 to a deviated center portion of the same tip 180 will result in a misalignment of said filament with respect of its intended position on said surface of said substrate or print/object, which in turn may result in a defective three-dimensional article and/or decreases the precision of the additive manufacturing. A small portion of the protective coating 169 will stay on the filament outside said filament feeding nozzle exit during additive manufacturing due to the fact that the protective coating is flame retardant and/or self-extinguishing. A length of said small portion of said remaining protective coating during manufacturing may be at least few tenth of mm.

Figure 3A:
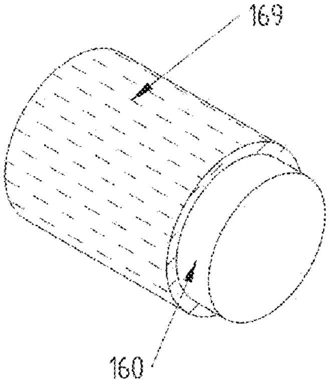
FIG. 3*a-c* depict various example embodiments of a glass filament with protective coating.
Figure 3B:
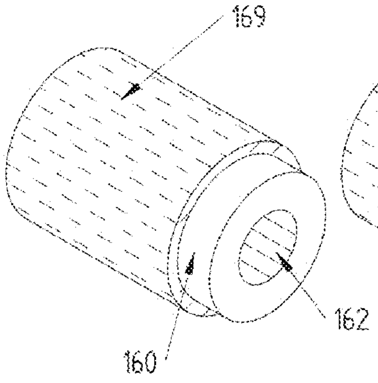
Figure 3C:
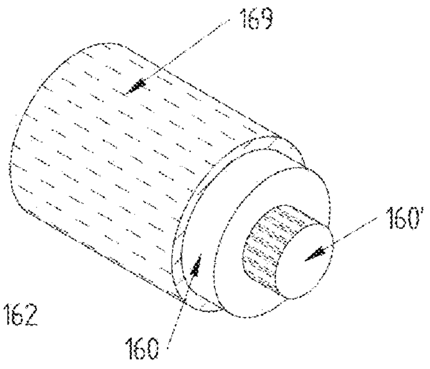

FIG. 3*a-c* depicts three different types of glass filaments 160 with protective coating 169, which may be used in the additive manufacturing process. FIG. 3*a* depicts a single composition (rod/fiber filament), where the composition (type of glass) can be high purity silica glass, e.g., fused silica and fused quartz glass (used for printing high purity transparent glass). These materials have low thermal expansion coefficient. i.e., does not need heated print plate and post thermal annealing is not always necessary. Silica glass filament with $GeO_2$, $Al_2O_3$, $B_2O_3$, or F co-doping, or combinations of these. Multifilament printing (together with silica glass filament) can be used to create 3D prints with designed shape and refractive index structure. Example can be fabrication of optical fiber preforms or different optical components. Silica glass doped with rare earth oxides, of e.g., Er, Yb, Er/Yb in combination with additional dopants (e.g., $GeO_2$, $Al_2O_3$, $B_3O_3$, F). These filaments can be used to create 3D prints of active laser material. Silicates, borosilicates, alumino-boro silicates and soda-lime glass present low (er) cost materials of standard type. Due to higher thermal expansion coefficients these may require heated printing plate and post thermal annealing to alleviate stress.

FIG. 3*b* depicts a glass filament 160 with a central air hole 162, i.e., a capillary or hollow structure. These capillary/hollow filaments can be used to print different types of glass/air structures. If pressure control is applied to the inner section of the capillary filament, active contraction/expansion of the filament during printing is possible. The volume of said air hole 162 may be between 10-70% of a volume of said glass content in said glass filament 160. The air hole 162 may be centered or non-centered in said glass filament 160. In various example embodiments said glass filament 160 may be provided with a plurality of air holes.

FIG. 3*c* depicts a glass filament 160 consisting of silica-based composition contain a central core structure 160' of a refractive index modifying dopant, e.g., $GeO_2$, $Al_2O_3$, $B_3O_3$, F. These core/cladding filaments, which function as optical waveguides, can be used to print optical circuits on different types of glass substrates for use in telecommunication, sensing or biomedical applications. Other core materials, besides glass based, include semiconductor and alloys, e.g., silicon, germanium etc.

The filament may be continuously fed towards a substrate, while simultaneously, a hot-zone created by a single or multiple laser beams bond them together. The relative motion between the substrate and the filament is under computer control to define the printed shape.

Simple structures such as micro-spheres, pillars, lines, circles and nano-tapers etc. were printed by single deposition. Printing free-standing models/arrays was also demonstrated. Multi-layer printing in complex geometry was realized. Both hollow models (vase mode) and dense models (100% infill) were printed using the glass filament. Conclusively, the glass filament is applicable to all glass 3d printing tests above and the performance is similar to the plastic filament in FDM systems.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. An additive manufacturing method for producing a three-dimensional component made of glass, said method comprising the steps of:

a. feeding continuously a single glass filament from a filament feeding nozzle, wherein the glass filament has a single flame retardant or self-extinguishing protective film applied to the surface thereof, to a heating source for removing said flame retardant or self-extinguishing protective film and softening said glass filament, b. applying said softened glass filament to a surface of a substrate, wherein said single flame retardant or self-extinguishing protective film has a thickness in the range of 1 μm to 50 μm, and c. wherein a fed glass filament length is a distance between the filament feeding nozzle and said surface of the substrate, and is less than 5 millimeters.

2. The method according to claim 1, wherein said glass filament is a glass fiber having a diameter in the range of 100-500 μm.

3. The method according to claim 2, wherein said heating source is at least one laser source.

4. The method according to claim 1, wherein said heating source is at least one laser source.

5. The method according to claim 2, wherein the glass filament is a hollow filament, and wherein the method further comprises the step of providing a gas pressure inside the hollow filament for producing a three-dimensional component having said hollow filament.

6. The method according to claim 4, wherein the glass filament is a hollow filament, and wherein the method further comprises the step of providing a gas pressure inside the hollow filament for producing a three-dimensional component having said hollow filament.

7. The method according to claim 3, wherein the glass filament is a hollow filament, and wherein the method further comprises the step of providing a gas pressure inside the hollow filament for producing a three-dimensional component having said hollow filament.

8. The method according to claim 1, wherein the glass filament is a hollow filament, and wherein the method further comprises the step of providing a gas pressure inside the hollow filament for producing a three-dimensional component having said hollow filament.

* * * * *